Figure 1:
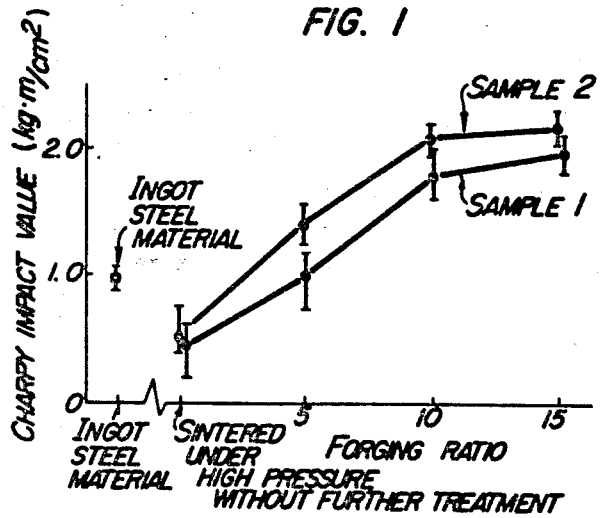
Figure 2A:
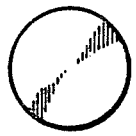
Figure 2B:
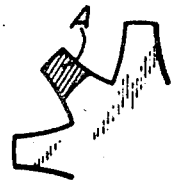
Figure 2C:
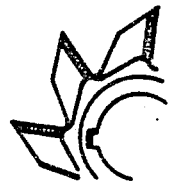
Figure 3:
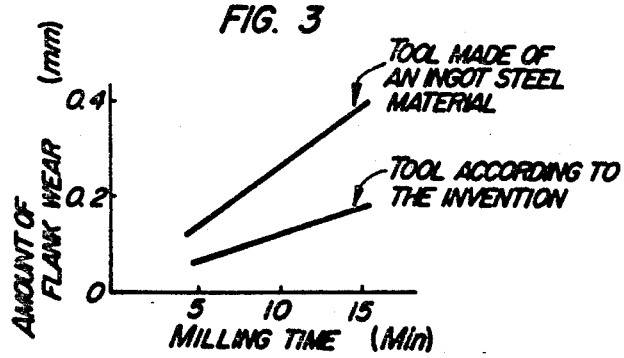

419-28 $$$ SR
C467Y XR T 943,008

Feb. 3, 1976 H. HARA T943,008

METHOD FOR MANUFACTURING TOOL ALLOYS BY POWDER METALLURGY

Original Filed Sept. 9, 1974

DEFENSIVE PUBLICATION

UNITED STATES PATENT AND TRADEMARK OFFICE

Published at the request of the applicant or owner in accordance with the Notice of Dec. 16, 1969, 889 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED FEBRUARY 3, 1976

943 O.G. 76

T943,008

METHOD FOR MANUFACTURING TOOL ALLOYS BY POWDER METALLURGY

Hisao Hara, Kumagaya, Japan, assignor to Hitachi Metals, Ltd., Tokyo, Japan

Filed Sept. 9, 1974, Ser. No. 504,255
Claims priority, application Japan Sept. 12 1972
48/102,124
Int. Cl. B22f 7/06
U.S. Cl. 148—11.5
1 Sheet Drawing. 9 Pages Specification

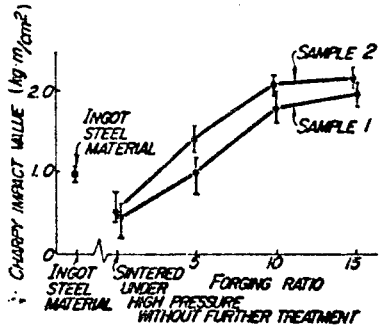

A method for manufacturing tool alloys by powder metallurgy, wherein alloys in powder form are filled in containers or sintered, and the containers containing the powder alloys therein or the coherent solid bodies thus sintered are subjected to hot plastic working until the reduction of area exceeds 80%. The method is effective to produce tool alloys having high performance including high wear resistance, high heat resistance and high toughness which exhibit efficient performance.